United States Patent
Rohlf (10) Patent No.: US 10,552,308 B1
(45) Date of Patent: Feb. 4, 2020

(54) ANALYZING ATTRIBUTES OF MEMORY MAPPINGS TO IDENTIFY PROCESSES RUNNING ON A DEVICE

(71) Applicant: Square, Inc., San Francisco, CA (US)

(72) Inventor: Christopher Rohlf, Lincroft, NJ (US)

(73) Assignee: Square, Inc., San Francisco, CA (US)

( * ) Notice: Subject to any disclaimer, the term of this patent is extended or adjusted under 35 U.S.C. 154(b) by 132 days.

(21) Appl. No.: 15/631,858

(22) Filed: Jun. 23, 2017

(51) Int. Cl.
*G06F 13/00* (2006.01)
*G06F 12/02* (2006.01)
*G06F 12/08* (2016.01)
G06F 12/1009 (2016.01)
G06F 12/109 (2016.01)

(52) U.S. Cl.
CPC ............ *G06F 12/023* (2013.01); *G06F 12/08* (2013.01); *G06F 12/1009* (2013.01); *G06F 12/109* (2013.01)

(58) Field of Classification Search
CPC .... G06F 12/109; G06F 12/1009; G06F 12/08; G06F 12/023
USPC ........................................................ 711/206
See application file for complete search history.

(56) References Cited

U.S. PATENT DOCUMENTS

| | | |
|---|---|---|
| 5,394,395 A | 2/1995 | Nagai et al. |
| 5,802,341 A * | 9/1998 | Kline .................. G06F 12/1009 711/209 |
| 6,192,142 B1 | 2/2001 | Pare, Jr. et al. |
| 7,181,768 B1 | 2/2007 | Ghosh et al. |
| 7,228,566 B2 | 6/2007 | Caceres et al. |
| 7,444,358 B2 | 10/2008 | Paczkowski et al. |
| 7,472,172 B2 | 12/2008 | Anderson et al. |
| 7,840,763 B2 | 11/2010 | Murotake et al. |
| 7,941,835 B2 | 5/2011 | Wolfond et al. |
| 8,180,917 B1 | 5/2012 | Yan et al. |
| 8,307,099 B1 | 11/2012 | Khanna et al. |
| 8,423,043 B2 | 4/2013 | Kazmi |
| 8,627,414 B1 | 1/2014 | McCune et al. |

(Continued)

FOREIGN PATENT DOCUMENTS

WO 2018/006060 A1 1/2018

OTHER PUBLICATIONS

"Maximum lifetime for user ticket," Microsoft, published May 8, 2012, Retrieved from the Internet URL: https://technet.microsoft.com/en-us/library/jj852169(v=ws.11).aspx, on Sep. 21, 2017, pp. 1-3.

(Continued)

*Primary Examiner* — Charles Rones
*Assistant Examiner* — Han V Doan
(74) *Attorney, Agent, or Firm* — Lee & Hayes, P.C.

(57) ABSTRACT

Techniques for determining whether processes are running on a computing device are described. As an example, a detection process may create a virtual mapping of data to memory of the computing device. The detection process may access a file system storing special files including attributes of virtual memory mappings. The detection process may analyze the attributes of the virtual memory mapping, such as an amount of data stored or shared by the memory mapping, to determine that another process is sharing the memory mapping with the detection process. The detection process may send data to a server associated with the computing device indicating that a process other than the detection process is operating on the computing device.

20 Claims, 6 Drawing Sheets

(56) References Cited

U.S. PATENT DOCUMENTS

| | | |
|---|---|---|
| 8,696,765 B2 | 4/2014 | Mendez et al. |
| 8,805,865 B2 | 8/2014 | Samari et al. |
| 8,826,426 B1 | 9/2014 | Dubey |
| 8,875,286 B2 | 10/2014 | Friedrichs et al. |
| 8,925,092 B1 | 12/2014 | Johansson et al. |
| 8,990,121 B1 | 3/2015 | Guise et al. |
| 8,997,230 B1 | 3/2015 | McCauley et al. |
| 9,202,057 B2 | 12/2015 | Mao et al. |
| 9,402,161 B2 | 7/2016 | Marti et al. |
| 9,652,610 B1 | 5/2017 | McCauley et al. |
| 9,734,495 B2 | 8/2017 | Rose et al. |
| 9,779,449 B2 | 10/2017 | Meyer et al. |
| 2001/0020211 A1 | 9/2001 | Takayama et al. |
| 2002/0120871 A1 | 8/2002 | Watkins et al. |
| 2002/0194490 A1 | 12/2002 | Halperin et al. |
| 2003/0014664 A1 | 1/2003 | Hentunen |
| 2003/0056076 A1* | 3/2003 | Cook .................. G06F 9/5016 711/173 |
| 2004/0030912 A1 | 2/2004 | Merkle, Jr. et al. |
| 2004/0141547 A1 | 7/2004 | Paquelet |
| 2005/0108495 A1* | 5/2005 | McKenney ......... G06F 17/5045 711/170 |
| 2005/0182913 A1* | 8/2005 | Zimmer .................. G06T 1/60 711/207 |
| 2005/0183072 A1 | 8/2005 | Horning et al. |
| 2005/0278535 A1 | 12/2005 | Fortune et al. |
| 2006/0036670 A1 | 2/2006 | Musman |
| 2006/0156011 A1 | 7/2006 | Masui |
| 2006/0164213 A1 | 7/2006 | Burghard et al. |
| 2006/0282660 A1 | 12/2006 | Varghese et al. |
| 2007/0174910 A1 | 7/2007 | Zachman et al. |
| 2007/0214088 A1 | 9/2007 | Graham et al. |
| 2007/0240219 A1 | 10/2007 | Tuvell et al. |
| 2007/0271457 A1 | 11/2007 | Patil et al. |
| 2008/0091681 A1 | 4/2008 | Dwivedi et al. |
| 2008/0167980 A1 | 7/2008 | Aaron et al. |
| 2009/0015418 A1 | 1/2009 | Koike |
| 2009/0031141 A1 | 1/2009 | Pearson et al. |
| 2009/0199296 A1 | 8/2009 | Xie et al. |
| 2009/0253408 A1 | 10/2009 | Fitzgerald et al. |
| 2010/0107245 A1 | 4/2010 | Jakubowski et al. |
| 2011/0047620 A1 | 2/2011 | Mahaffey et al. |
| 2011/0078034 A1 | 3/2011 | Hayhow |
| 2011/0078791 A1 | 3/2011 | Prakash et al. |
| 2011/0093920 A1 | 4/2011 | Etchegoyen |
| 2011/0214184 A1 | 9/2011 | Whitehouse et al. |
| 2011/0247045 A1 | 10/2011 | Rajagopal et al. |
| 2011/0265182 A1 | 10/2011 | Peinado et al. |
| 2011/0314145 A1 | 12/2011 | Raleigh et al. |
| 2012/0030763 A1 | 2/2012 | Adams |
| 2012/0084203 A1 | 4/2012 | Mehew et al. |
| 2012/0144493 A1 | 6/2012 | Cole et al. |
| 2012/0167162 A1 | 6/2012 | Raleigh et al. |
| 2012/0210423 A1 | 8/2012 | Friedrichs et al. |
| 2012/0210431 A1 | 8/2012 | Ståhlberg et al. |
| 2012/0216242 A1 | 8/2012 | Uner et al. |
| 2012/0310830 A1 | 12/2012 | Paulsen et al. |
| 2012/0311322 A1 | 12/2012 | Koyun et al. |
| 2012/0324557 A1 | 12/2012 | Rubin et al. |
| 2012/0331553 A1 | 12/2012 | Aziz et al. |
| 2013/0097652 A1 | 4/2013 | Bhattacharjee et al. |
| 2013/0111591 A1 | 5/2013 | Topan et al. |
| 2013/0117854 A1 | 5/2013 | Britton et al. |
| 2013/0217333 A1 | 8/2013 | Sprigg et al. |
| 2013/0226717 A1 | 8/2013 | Ahluwalia et al. |
| 2013/0305368 A1 | 11/2013 | Ford |
| 2013/0312098 A1 | 11/2013 | Kapoor et al. |
| 2014/0129596 A1 | 5/2014 | Howe |
| 2014/0201126 A1 | 7/2014 | Zadeh et al. |
| 2014/0337243 A1 | 11/2014 | Dutt et al. |
| 2015/0026479 A1 | 1/2015 | Yi et al. |
| 2015/0033227 A1* | 1/2015 | Lin ..................... G06F 21/55 718/1 |
| 2015/0066769 A1 | 3/2015 | Tallal, Jr. |
| 2015/0088744 A1 | 3/2015 | Raduchel |
| 2015/0140962 A1 | 5/2015 | Mapes |
| 2015/0177010 A1 | 6/2015 | Abramson et al. |
| 2015/0254606 A1 | 9/2015 | Bhalodia et al. |
| 2015/0356003 A1* | 12/2015 | Koh ..................... G06F 16/00 711/6 |
| 2015/0378895 A1* | 12/2015 | Gschwind ........... G06F 12/084 711/130 |
| 2018/0005230 A1 | 1/2018 | Zovi et al. |
| 2018/0005243 A1 | 1/2018 | Zovi et al. |

OTHER PUBLICATIONS

Rowley, J., "How Short-Lived Certificates Improve Certificate Trust," DigiCert Blog, published Feb. 4, 2016, Retrieved from the Internet URL: https://www.digicert.com/blog/short-lived-certificates/, on Sep. 21, 2017, pp. 1-5.

Non-Final Office Action dated Aug. 13, 2014, U.S. Appl. No. 13/800,587, of McCauley, N., et al., filed Mar. 13, 2013.

Notice of Allowance dated Jan. 22, 2015, U.S. Appl. No. 13/800,587, of McCauley, N., et al., filed Mar. 13, 2013.

Non-Final Office Action dated Mar. 3, 2015, U.S. Appl. No. 13/800,670, of McCauley, N., et al., filed Mar. 13, 2013.

Final Office Action dated Sep. 11, 2015, for U.S. Appl. No. 13/800,670, of McCauley, N. et al., filed Mar. 13, 2013.

Non-Final Office Action dated Oct. 7, 2015, for U.S. Appl. No. 14/631,724, of McCauley, N., et al., filed Feb. 25, 2015.

Advisory Action dated Jan. 20, 2016, for U.S. Appl. No. 13/800,670, of McCauley, N., et al., filed Mar. 13, 2013.

Final Office Action dated Mar. 10, 2016, for U.S. Appl. No. 14/631,724, of McCauley, N., et al., filed Feb. 25, 2015.

Advisory Action dated May 27, 2016, for U.S. Appl. No. 14/631,724, of McCauley, N., et al., filed Feb. 25, 2015.

Non-Final Office Action dated Jul. 18, 2016, for U.S. Appl. No. 14/631,724, of McCauley, N., et al., filed Feb. 25, 2015.

Notice of Allowance dated Jan. 13, 2017, for U.S. Appl. No. 14/631,724, of McCauley, N., et al., filed Feb. 25, 2015.

Non-Final Office Action dated Nov. 1, 2017, for U.S. Appl. No. 13/800,670, of McCauley, N., et al., filed Mar. 13, 2013.

Non-Final Office Action dated Feb. 16, 2018, for U.S. Appl. No. 14/709,250, of Zovi, D.D., et., al., filed May 11, 2015.

International Search Report and Written Opinion for International Application No. PCT/US2017/040460, dated Sep. 29, 2017.

Ferebee, D., et al., "Security Visualization: Cyber Security Storm Map and Event Correlation," IEEE Symposium on Computational Intelligence in Cyber Security (CICS), pp. 171-178 (2011).

Hosseini, Z., Z., and Barkhordari E., "Enhancement of security with the help of real time authentication and one time password in e-commerce transactions," The 5th Conference on Information and Knowledge Technology, IEEE, pp. 268-273 (2013).

Final Office Action dated Sep. 18, 2018, for U.S. Appl. No. 14/709,250, of Zovi, D., D., et., al., filed May 11, 2015.

Final Office Action dated Nov. 2, 2018, for U.S. Appl. No. 13/800,670, of McCauley, N., et., al., filed Mar. 13, 2013.

Advisory Action dated Jan. 28, 2019, for U.S. Appl. No. 14/709,250, of Zovi, D.D., et., al., filed May 11, 2015.

Notice of Allowance dated Mar. 20, 2019, for U.S. Appl. No. 15/199,917 of Zovi, D.D., et al. filed Jun. 30, 2016.

Ex-Parte Quayle Action mailed Apr. 19, 2019, for U.S. Appl. No. 15/199,933, of Zovi, D.D., et al., filed Jun. 30, 2016.

Notice of Allowance dated May 1, 2019, for U.S. Appl. No. 13/800,670, of McCauley, N., et al., filed Mar. 13, 2013.

Non-Final Office Action dated May 17, 2019, for U.S. Appl. No. 15/433,812, of Mulliner, C., filed Feb. 15, 2017.

Notice of Allowance dated May 24, 2019, for U.S. Appl. No. 15/199,917 of Zovi, D.D., et al., filed Jun. 30, 2016.

* cited by examiner

ANALYZING ATTRIBUTES OF MEMORY MAPPINGS TO IDENTIFY PROCESSES RUNNING ON A DEVICE

BACKGROUND

With the continued proliferation of technology in the daily activities of our society, private user information is commonly input to computing devices, and communicated over networks by these computing devices. For example, merchants commonly install software provided by payment processing services on point-of-sale computing devices to perform transactions with customers using electronic payment instruments. While these types of technological advances greatly increase user satisfaction by allowing transactions with merchants using electronic payment instruments, and increase profits for merchants by receiving payments from users who do not commonly carry non-electronic payment means, there are often security issues with computing devices handling private user information. For example, untrustworthy merchants or hackers may attempt to obtain private user information as the information is communicated over networks, or locally at the computing devices. Various types of attacks are used to access the private user information, such as side-channel attacks, eavesdropping attacks, bait and switch attacks, etc. Generally, the types of attacks which attempt to improperly obtain private user information locally at a computing device involve a program running locally on the computing device.

Often, operating systems provide visibility to users as to what programs are currently running on the operating system (OS). When using these types of operating systems, potentially malicious programs can be easily identified, and actions can be taken to prevent sensitive information from being access by these malicious programs. However, some types or versions of operating systems do not provide visibility as to which programs are running on a device, or whether programs are running on the device, which prevents entities, such as payment processing services, from determining whether malicious programs are running on computing devices. Thus, entities who obtain sensitive information locally at a computing device for a lawful purpose may be vulnerable to attack by malicious programs running on these computing devices.

BRIEF DESCRIPTION OF THE DRAWINGS

The above and other features of the present disclosure, its nature and various advantages, will be more apparent upon consideration of the following detailed description, taken in conjunction with the accompanying drawings in which.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The techniques and systems described herein are directed to determining whether programs or processes are running locally on a computing device. In some examples, the computing device may be controlled by a type, or version, of an operating system that does not provide visibility to applications, such as unprivileged applications, as to whether any processes are currently running on the operating system. However, in some instances these applications may be dealing with sensitive information that is to be protected from unauthorized entities, such as malicious programs. For example, payment processing systems may provide software to merchants to install on point-of-sale devices to enable transactions using electronic payment instruments, which involves private payment information of customers (e.g., credit card numbers, personal identification numbers (PINs), bank account information, etc.). The techniques and systems described herein determine whether processes are running on a computing device to prevent unauthorized processes from obtaining sensitive information.

In various examples, the techniques described herein include performing a detection process, which may resemble a side-channel attack, where information is indirectly gained regarding the physical, or hardware, implementation of a process. More specifically, the techniques of the detection process may resemble creating a side-channel process that shares a physical memory mapping with other processes on a computing device. The techniques may include analyzing information for a virtual memory mapping which shares a physical memory mapping to determine whether other processes are sharing the physical memory mapping. In some examples, the detection process may implement functionality to resemble or mimic how an operating system would map data to memory of a device.

Due to the limited amount of memory (e.g., random access memory (RAM)) in computing devices, multiple processes operating simultaneously on an operating system of the computing device often share mappings between their respective virtual address spaces, and the physical address space of the memory. This shared memory avoids redundant copies of files stored in memory, which is an efficient method for sharing data between programs in order to reduce memory usage. However, only certain types of data, pages, or files may be shared in memory among processes. Generally, files, data, or pages marked with a "read-only" attribute are types of data that may be shared among processes as they are not writable.

In some examples, a detection process operating on a computing device may be implemented to identify data (e.g., file, page, binary text, etc.) to map to memory of the computing device. In some examples, the detection process may identify data marked as read-only. In various instances, it may be advantageous to identify data commonly used by processes operating on an operating system of a computing device. For instance, data that is commonly used by processes when operating, or required by processes to operate, may be identified, such as shell programs, virtual private network (VPN) programs, etc.

The detection process may then map the identified data into the memory. The detection process may map the identified data into memory to mimic how a kernel of an operating system maps in binary data when operating. In some examples, mapping the data into memory may include loading a portion of a file, such as a page sized portion of a file, from permanent storage (e.g., hard drive) into memory (e.g., RAM). In various examples, mapping the data into the memory may include executing a system call mapping function to create a private mapping, backed by files on the hard drive, of the data from a virtual address space of the detection process to a physical address space of the memory. In this way, the detection process may read the data from the memory.

After mapping the data into memory, the detection process may execute one or more functions for analyzing attributes of the virtual memory mapping for the file in which the data is stored. In some examples, various computing devices (e.g., ANDROID® devices) may operate various UNIX®-based operating systems (e.g., LINUX® operating systems, ANDROID® operating systems, etc.). In such examples, a special file system (e.g., procfs) may be exposed by a kernel of the operating system, where the file system contains entries for each process running on the operating system, and special files (e.g., status, iomem, hardware attribute files (SMAPS)) that contain information about the kernel and attributes of the processes. In some examples, each process may have its own special file exposed in the file system which contains information related to each memory mapping currently in the process. In various examples, the detection process may access a special file in the file system corresponding to the mapping of the data from the file created by the detection process. Further, the detection process may analyze the special file to identify various attributes of the mapping, such as a total amount of the data stored, or shared, in the memory from the file (e.g., proportional set size).

In various examples, the detection process may determine whether the total amount of the data from the file stored and/or shared in the memory is different from the data mapped by the detection process. For instance, the system call mapping function called by the detection process may allow the detection process to indicate an amount of data to be mapped to the memory. If the total amount of the data from the file stored or shared in the memory is different (e.g., greater) than the amount of data shared by the detection process, then the detection process may determine that another process is sharing a mapping of data to the physical address in memory with the detection process.

While the detection process may not have visibility regarding what process is sharing the memory with the mapping created by the detection process, the knowledge of knowing that another process other than the detection process may be sufficient to identify a potentially malicious process running on a computing device. For example, in the realm of transactions by merchants using point-of-sale devices, the only processes that should be running on the point-of-sale devices would be the software installed on the devices to perform the transactions. Accordingly, if the detection process shuts down any processes running by the software installed on the point-of-sale devices by a merchant or payment processing service, then the detection of any process running other than the detection process would be deemed as potentially malicious.

If it is determined that a process other than the detection process is running on the computing device, the detection process may perform various actions. For instance, the detection process may send data (e.g., the amount of data mapped by the detection process, the total amount of data stored or shared in the memory, etc.) to a server associated with the payment process service. In some examples, the detection process may send an indication that a process other than the detection process is running on the computing device. In various examples, the detection process and/or payment processing service may additionally or alternatively refrain from granting a secure session, which may prevent the receipt of payment information from a customer.

Thus, a detection process may determine whether processes are running on a computing device using the techniques described herein. While some of the examples and description herein are with reference to UNIX®-based operating systems, the techniques may be equivalently used with any operating systems. The techniques may be used in any instance or for any operating system, but may be particularly applicable in situations where an application is operating on an operating system which does not provide visibility regarding currently operating processes, and/or when the application is operating without privileges to view currently operating process on the operating system. Further, while techniques are described with reference to point-of-sale devices which operate software associated with payment processes systems, the techniques may be applicable to any type of device and for any type of data. As discussed herein, sensitive data may include any type of confidential/classified information or knowledge that might result in loss of an advantage or level or security if disclosed to others, or personal information that might result in negative effects on its owner if disclosed to others.

The techniques described herein affect computer operations in various ways. For example, as noted above various types of operating systems do not provide visibility regarding whether processes are running on the operating system. Thus, malicious processes may run on devices using these types of operating systems that are undetectable by other processes in order to fraudulently obtain data or interfere with other processes, which presents a problem rooted in computer technology. Using the techniques described herein, it may be determined whether a process is running on a computer by executing a process which mimics how a kernel would map data to memory, and analyzing attributes of that virtual memory mapping to determine whether another background process is sharing a physical memory mapping corresponding to the virtual memory mapping of the process.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding introduction is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Figure 1:
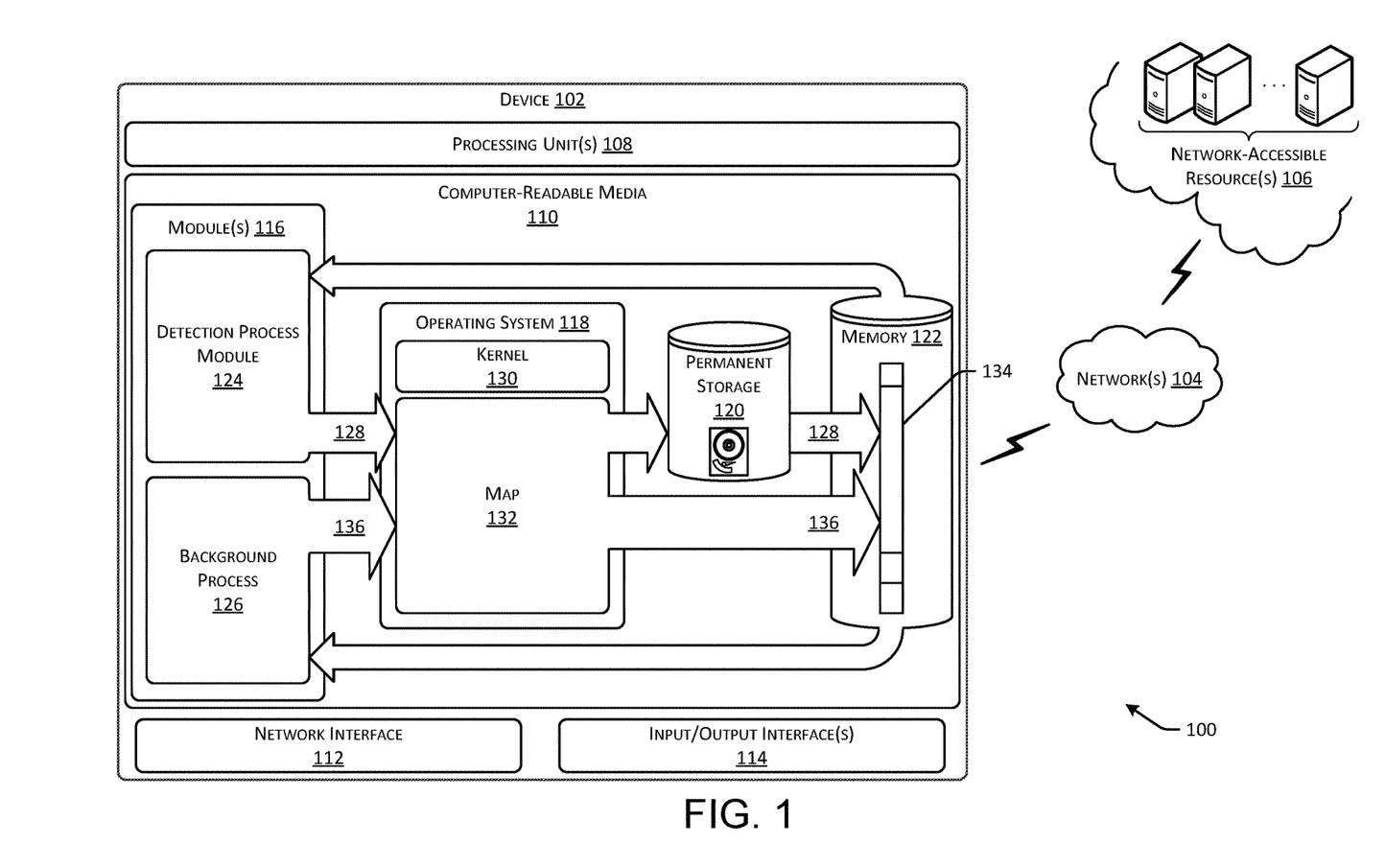
FIG. 1 depicts an example environment in which a detection process operates on a device to determine that a process is running on the device.

FIG. 1 depicts an example environment 100 in which a detection process operates on a computing device to determine that a background process is running on the computing device. As shown, example environment 100 includes a device 102 which communicates over one or more networks 104 to one or more network-accessible resources 106.

The device 102 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., navigation system), an appliance, a camera, a robot, a hologram system, a security system, a home-based computer system (e.g., intercom system, home media system, etc.), a projector, an automated teller machine (ATM), and so on. In some instances, the device 102 may be a merchant device.

In some examples, the device 102 may include one or more processing units 108, computer-readable media 110, one or more network interfaces 112, and one or more input/output interfaces 114. In some examples, the processing unit(s) 108 may execute one or more modules and/or processes to cause the device 102 to perform a variety of functions, as set forth above and explained in further detail in the following disclosure. In some examples, the processing unit(s) 108 may include a central processing unit (CPU), a graphics processing unit (GPU), both CPU and GPU, or other processing units or components known in the art. Additionally, each of the processing unit(s) 108 may possess its own local memory, which also may store program modules, program data, and/or one or more operating systems. Depending on the exact configuration and type of the device 102, the computer-readable media 110 may include volatile memory (such as RAM), non-volatile memory (such as ROM, flash memory, miniature hard drive, memory card, or the like), or some combination thereof. The computer-readable media 110 (as well as all other types of memory or storage described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

In various examples, the device 102 may include input/output interface(s) 114. Examples of input/output interface(s) 114 may include a keyboard, a mouse, a pen, a voice input device, a touch input device, a display, etc. Furthermore, the device 102 may include a network interface 112 for interfacing with the network(s) 104, as described below. The network interface 112 may be any network interface hardware components that may allow the device 102 to communicate over the network(s) 104. The one or more networks 104 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 104 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the environment 100 may communicatively couple to the one or more networks 104 in any manner, such as by a wired or wireless connection.

In at least one example, the computer-readable media 110 may include one or more modules or instructions to enable the device 102 to determine whether background processes or modules are operating on the device 102. The one or more modules or instructions may be implemented as more processes or as fewer processes, and functions described for the processes may be redistributed depending on the details of the implementation. The terms "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 108) to configure the device 102 to execute instructions and to perform operations described herein.

In some examples, the computer-readable media 110 may include various components, including one or more modules 116, an operating system 118, permanent storage 120, and memory 122. In various examples, the module(s) 116 may include a detection process module 124 and a background process 126. In some examples, the detection process module 124 and background process 126 may comprise applications, computer-readable instructions, functions, or any other type of data configured to cause the processing unit(s) 108 of the device 102 to perform various operations.

In some examples, the detection process module 124 may execute one or more functions to determine whether the background process 126 is operating on the device 102. For instance, the operating system 118 may comprise a type of operating system (e.g., ANDROID® OS version 4.4 and newer versions of the ANDROID® OS) which does not provide visibility to unprivileged applications or processes (e.g., detection process module 124) regarding what applications or processes are operating on the device 102. In various examples, the detection process module 124 may identify a file stored in the device 102 which is likely to be used by a background process 126. For instance, files such as shell files (e.g., /system/bin/sh), other system binary files (e.g., busybox files), VPN files (e.g., Surf Easy VPA), or other types of files may be identified. In some examples, the types of files may comprise data marked with a "read-only" attribute. Upon identifying or determining a file, the detection process module 124 may determine a virtual address for the file, and create a mapping 128 from a virtual address space of the detection process module 124 to a physical address space of the memory 122. In some examples, creating the mapping 128 may include use of the operating system 118.

In various examples, the operating system 118 may perform various activities for coordination functions with the software, hardware, and/or firmware of the device 102. The operating system may include a kernel 130 and a map 132. In various examples, the kernel 130 may perform various operations for interfacing between the module(s) 116 (and other applications) of the device 102 and the hardware of the device 102 (e.g., permanent storage 120, memory 122, processing unit(s) 108, etc.). In some instances, the map 132 may generally comprise listings or indications of what virtual addresses map to which physical addresses in permanent storage 120 and/or memory 122. For instance, the map 132 may indicate that the virtual address loaded by the detection process mode 124 to create the mapping 128 may indicate that the requested file exists in permanent storage 120 (e.g., hard-disk). In such examples, the operating system 118 may use the map 132 to translate the virtual address to the physical address and load the respective data and/or file from the permanent storage 120 into a physical address in the memory 122 (e.g., random access memory (RAM)). In some instances, the map 132 may then be updated to illustrate the physical address in memory 122 that now corresponds to the virtual address loaded by the detection process module 124. In other examples, the data may already be loaded into memory 122, and the mapping 128 may not load the data or file from permanent storage 122. In some instances, the function(s) executed by the detection process module 124 may indicate an amount of data to use in the mapping 128 (e.g., 4096 bytes or one "page" of data). Once the data or file is loaded into memory 122, at physical address 134, the detection process module 124 may read the data or file from memory 122.

In various examples, the physical address 134 in the physical address space of the memory 122 may be a shared memory object. For instance, as shown in FIG. 1, a background process 126 may also have mapped data or files using a mapping 136 to map data or files into the same physical address 134 of the memory 122. Thus, the physical address 134 may correspond to a shared object where the mapping 128 and mapping 136 share the memory 122 at physical address 134. In some examples, the kernel 130 of the operating system 118 may expose various attributes for processes or applications executing on the device 102. While the operating system 118 may not provide explicit visibility as to what applications are executing on the operating system 118, in various examples, the kernel exposes a file system (e.g., procfs) which exposes various special files (e.g., SMAPS files) that display attributes of the mapping 128 by the detection process module 124. In various examples, such as when the mapping 128 is sharing a physical mapping in the memory 122, the special files indicate attributes for the virtual memory mapping 128. By analyzing attributes of the special file corresponding to the virtual memory mapping 128, the detection process module 124 may determine that the background process 126 is sharing a physical memory mapping, and thus operating on the device 102. Thus, despite not having an operating system 118 which provides visibility as to what processes are operating on the device 102, or without certain privileges to obtain visibility as to whether other processes are operating on the operating system 118, the detection process module 124 may determine that the background process 126 is operating on the device 102. Further description of how the attributes contained in the special file of the file system are described below with respect to at least FIG. 3.

In various examples, upon determining that the background process 126 is operating on the device 102, the detection process module 124 may perform various functions. For instance, in the example of where the device 102 is a merchant device for performing payment transactions using electronic payment instruments, the detection process module 124 may prevent a secure session from being formed with a customer's electronic payment instrument. In some examples, the detection process module 124 may send, via the network interface 112, data to the network-accessible resource(s) (e.g., servers, cloud-based computing devices, etc.) indicating that a process other than the detection process module 124 is operating on the device 102. For instance, the detection process module 124 may send all, or a portion, of the data from the SMAPS file to the network-accessible resource(s) 106. In some examples, the network-accessible resource(s) 106 may perform operations based on the determination that the background process 126 is running, such as flagging the indication received from the device 102, or other remedial actions to prevent data from being compromised by the background process 126. In some instances, the detection process module 124 may simply relay data from the SMAPS file to the network-accessible resource(s) 106, which in turn analyzes the data to determine that the background process 126 is running.

The network-accessible resource(s) 106 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

In various examples, the detection process module 124 may be included or associated with other applications stored in the device. For instance, software for performing transactions between the device 102 and customers may include or be associated with the detection process module 124. In some examples, the detection process module 124 may be implemented as part of the operating system 118, or installed as an updated to the operating system 118.

Figure 2:
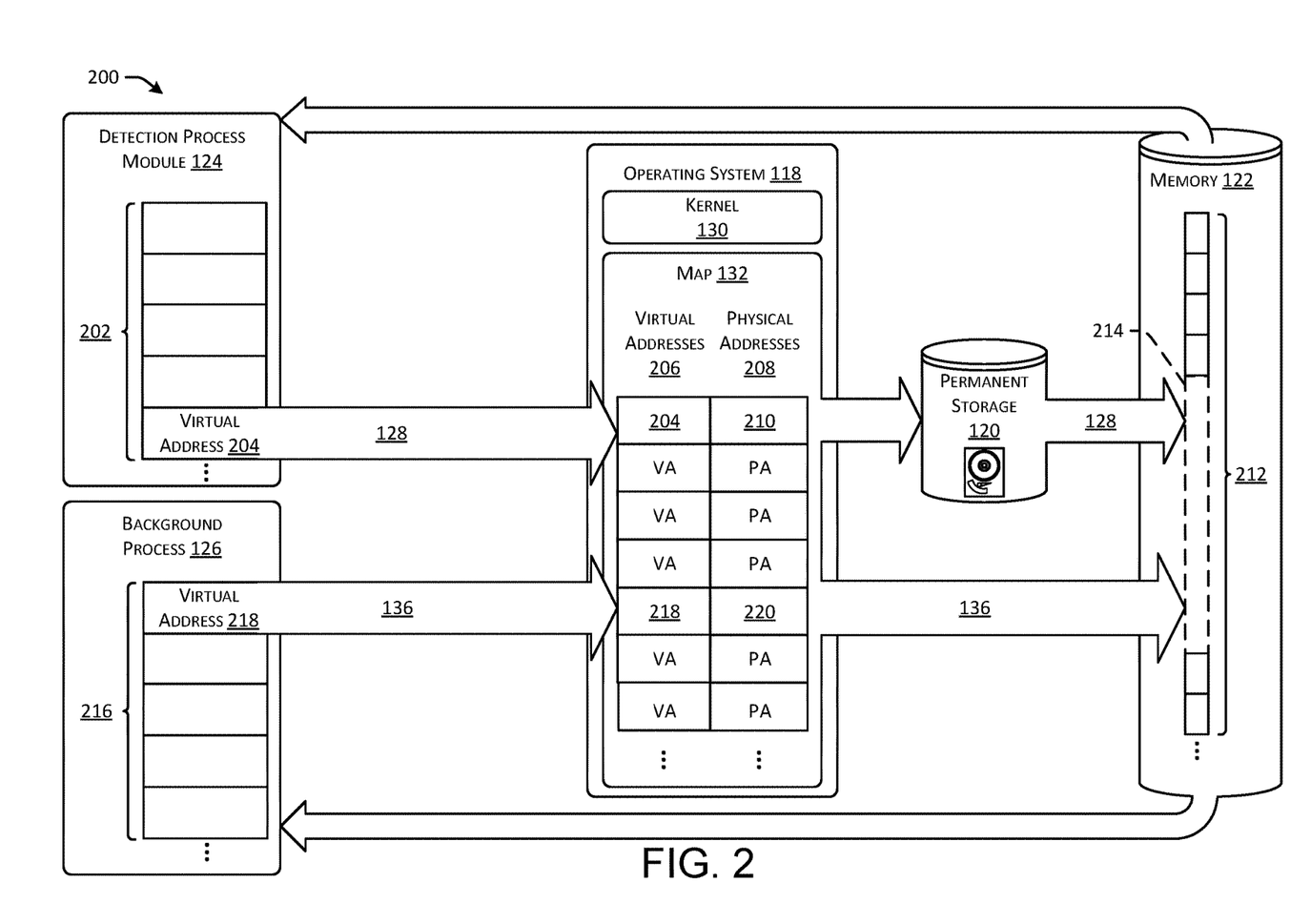
FIG. 2 depicts an example device including modules for determining whether a background process is running on the device, such as the device of FIG. 1.

FIG. 2 depicts modules of an example device 200 for determining whether a background process is running on the device 200. The device 200 may comprise any type of device, such as the device 102 in FIG. 1. As shown in FIG. 2, the detection process module 124 described in FIG. 1 includes a program virtual address space 202 (e.g., 32-bit program address space (4 GB), 64-bit program address space, etc.). As illustrated, the detection process module 124 executes a load in the virtual address space 202 which specifies a virtual address 204. In some examples, the virtual address 204 corresponds to an address for a file, or data in a file, as viewed by the detection process module 124. The detection process module 124 may use the virtual address 204 to create the mapping 128 for a portion of a file corresponding to the virtual address 204. In some examples, the detection process module 124 may map a page of a file into memory. For instance, the detection process module 124 may use code to map a page of a file, such as a/system/bin/sh file, into memory 122.

In various examples, the code may open the/system/bin/sh file and use the "mmap" system call mapping function to map a portion of the shell file into memory. In various examples, the mapping function may designate the size of the portion of data being mapped (e.g., 4,096 bytes or one "page") to memory 122. Further, the mapping created may use various permissions, such as the PROT_READ|PROT_EXEC permissions, along with flags such as the MAP_POPULATE|MAP_PRIVATE flags, to match how the operating system 118 loader would map the binary file. In some examples, the MAP_POPULATE flag may instruct the kernel 130 to perform a read ahead on the mapping, which populates page table information, and thus, populates a special file (e.g., SMAPS file) which exposes attributes of the mapping 128 to memory 122.

While the virtual address 204 used to create the mapping 128 may correspond to a shell file, such as the first page of the binary of the shell file, the mapping may be created using any type of file or binary on the device 200, particularly files including data marked as "read-only." However, in various examples the first page of binary of the shell file may be advantageous as it contains Executable and Linkable Format (ELF) Headers that are guaranteed to mapped into any other shell process.

In some examples, a map 132 maintained by the operating system 118 may indicate which virtual addresses 206 are associated with which physical addresses 208. In the example of FIG. 2, the virtual address 204 may be associated with a physical address 210, which is a file stored in permanent storage 120 (e.g., disk). However, in some examples the physical address 210 may correspond to a location in memory 122. The mapping function may cause the operating system 118 to load the file stored in permanent storage 120 to be loaded into a location in memory 122. After loading the data from the file indicated in the mapping function from permanent storage 120 into memory 122, the map 132 may be updated with the address of the data stored in memory 122. For instance, the operating system 118 may allocate a portion of memory 122 for use by the detection process module 124.

The memory 122 may include a physical address space 212 (e.g., 30-bit RAM address space) which defines addresses for different portions of the memory 122. As shown in FIG. 2, the physical address space 212 includes a physical address 214 for the file or data indicated in the mapping 128. Stated otherwise, the mapping 128 may map the data or file from permanent storage 120 to the physical address 214 of the memory 122. In the example shown, the physical address 214 comprises a shared memory space or object, where the physical address 214 is a shared physical memory mapping between the virtual mapping 128 and the virtual mapping 136. In various examples, the background process 126 may also include a virtual address space (e.g., 32-bit program address space (4 GB), 64-bit program address space, etc.) which specifies virtual addresses as seen by the background process 126. The background process may create the mapping 136 using the virtual address 218, which maps data of a file to the physical address 214 of the shared physical memory mapping in the memory 122. In some examples, the virtual address 218 may be the same as virtual address 204, or correspond to a same file or files as the virtual address 204. As shown, the map 132 may include a physical address 220 to which the virtual address 218 is translated, which maps the data or file in the mapping 136 into the memory 122 at the physical address 214. Thus, in some examples the detection process module 124 may have the virtual memory mapping 128 which shares a physical memory mapping at the physical address 214 of the memory 122 with the background process 126.

However, as described above the operating system 118 may not provide visibility to the detection process module 124, or any other process, regarding what processes are running on the device 200, such as the background process 126. In various examples, the kernel may expose or otherwise provide attributes of the mapping 128 to the physical address 214 in the memory 122, which may comprise a shared memory object that shares memory with the mapping 136 for the background process 126.

Figure 3:
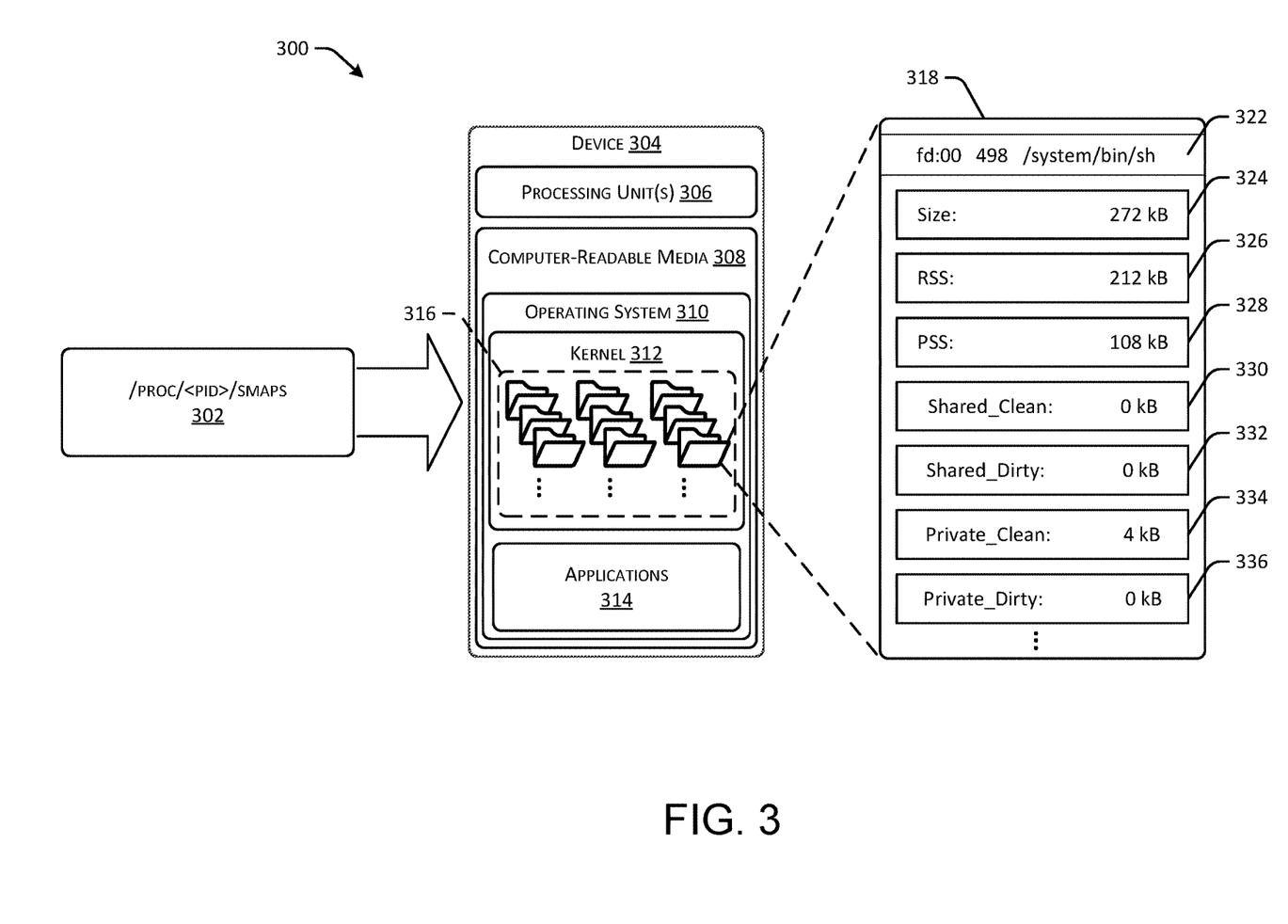
FIG. 3 depicts an example environment including a file system exposed by a kernel of an operating system of a device which includes special files indicating attributes of memory mappings for processes on the device.

FIG. 3 depicts an example environment 300 including a file system exposed by a kernel of a device which includes special files indicating attributes of mappings for processes on the device, such as the device of FIG. 1. The environment 300 may include an indication of a special file 302 in a file system stored in a device 304, where the device comprises one or more processing units 306, computer-readable media 308, an operating system 310, a kernel 312, one or more applications 314, and a file system 316 exposed by the kernel 312. In various examples, the device 304 may correspond to device 102 and/or device 200, and the components of the device 304 may correspond to components of the device 102 and/or the device 200. For instance, the applications 314 may include the detection process module 124 and the background process 126.

In various examples, the kernel 312 may expose the file system 316 (e.g., procfs), which may comprise one or more entries which correspond to mappings (e.g., mapping 128, mapping 136, etc.) for processes operating on the device 304. Each entry in the file may comprise a special file (e.g., SMAPS file) which indicates attributes for each of the mappings for each process running on the device 304.

As shown in environment 300, the indication of the special file 302 may correspond to the entry 318. Entry 318 may comprise an entry in the file system 316 which depicts attributes for a special file, such as/proc/self/smaps, indicating attributes for a mapping (e.g., mapping 128) for a process (e.g., detection process module 124). The entry 318 may include a mapping address 322 which contains the beginning and end address of the mapping, page permissions, and a name of the mapping. The entry may further include attributes or information related to each virtual memory mapping in the process, such as the size 324, the resident set size (RSS) 326, the proportional set size (PSS) 328, the shared_clean 330, the shared_dirty 332, the private_clean 334, and/or the private_dirty 336.

In some examples, the PSS 328 for the process is the count of pages the process has in the memory mapping, where each page is divided by the number of processes sharing it. Thus, if a process has 1000 pages all to itself in the memory, and 1000 are shared with another process, the PSS will be 1500. The shared_clean 330 may comprise the pages in the mapping that have been referenced by the process for which the entry 318 depicts the attributes and at least one other process, but are not written to by any process. The shared_dirty 332 may indicate the pages in the mapping that have been referenced by the process and at least one other process, and written to by at least one of those processes. The private_clean 334 may indicate the pages in the mapping that have been read and not written by the process, but not referenced by any other process. These pages are private to the process only.

In some examples, one or more of the attributes shown in the entry 318 may be used to detect if another process shares a mapping with the process. In the context of FIG. 1, the detection process module 124 may designate a size of the data or file mapped to memory 122 by the mapping 128. For instance, the detection process module 124 may map one page, or roughly 4 kB, of data from a file into memory. By analyzing the PSS 328, the detection process module 124 may determine that another process is sharing the physical memory mapping corresponding to the entry 318. As illustrated in FIG. 3, the PSS 328 is 108 kB, but the mapping 128 may only comprise a mapping of 4 kB of data. Thus, the detection process module 124 may determine, based on attributes contained in the entry 318 of the special file corresponding to the virtual mapping 128, that another process is sharing the physical memory mapping with the virtual mapping 128.

In some examples, the shared_dirty 332 and/or private_dirty 336 may be used to determine if another process is sharing the physical memory mapping corresponding to the entry 318 of the special file for the virtual memory mapping 128, or otherwise indicate that another process is running on the device 304. For example, every process has a standard c library mapped into memory, and because all the processes have the same c library, the executable pages of the c library are always going to be shared clean. Thus, if a background process has modified bytes, such as data in the detection process module's 124 library, then it can be determined using the shared_dirty 332 and/or private_dirty 336 that another process has modified data shared by the detection module process.

In some examples, the executable pages of the .text segment of the mapping 128 for the detection process module 124 may be modified. For example, the .text segment should be mapped as readable and executable, but not writable. If the .text segment is marked as writable, they were potentially modified and the pages may be marked as dirty, which is shown in the shared_dirty 332 and/or private_dirty 336. This may indicate that a process is running on the device 304 other than the detection process module 124, and that the other process has modified the .text segment of our detection process module 124, which may indicate malicious behavior.

While the techniques described in FIGS. 1-3 describe creating a single mapping by the detection process module 124, in other examples, the detection process module 124 may create multiple mappings using different data or files. For instance, the detection process module 124 may use a sampling of multiple different files or data to create mappings to memory 122 to determine if another process shares one of the multiple mappings. For instance, if a first mapping does not indicate that another process is running on the device 102, the detection process module 124 may continue to use different data or files to create additional mappings until a process is detected as sharing a mapping, or until a threshold amount of mappings have been attempted.

Figure 4:
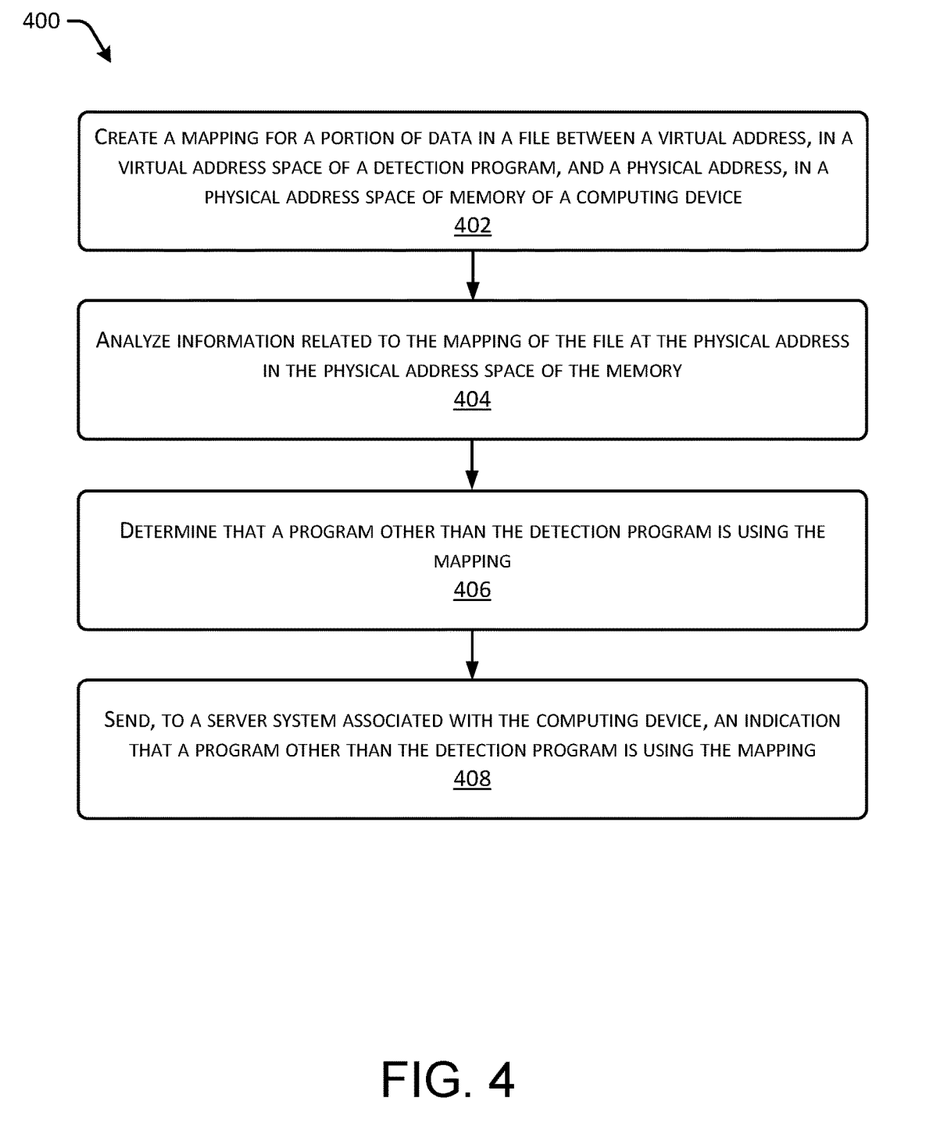
FIG. 4 depicts a non-limiting flow diagram illustrating a process for determining that another program other than a detection program is running on a device.
Figure 5:
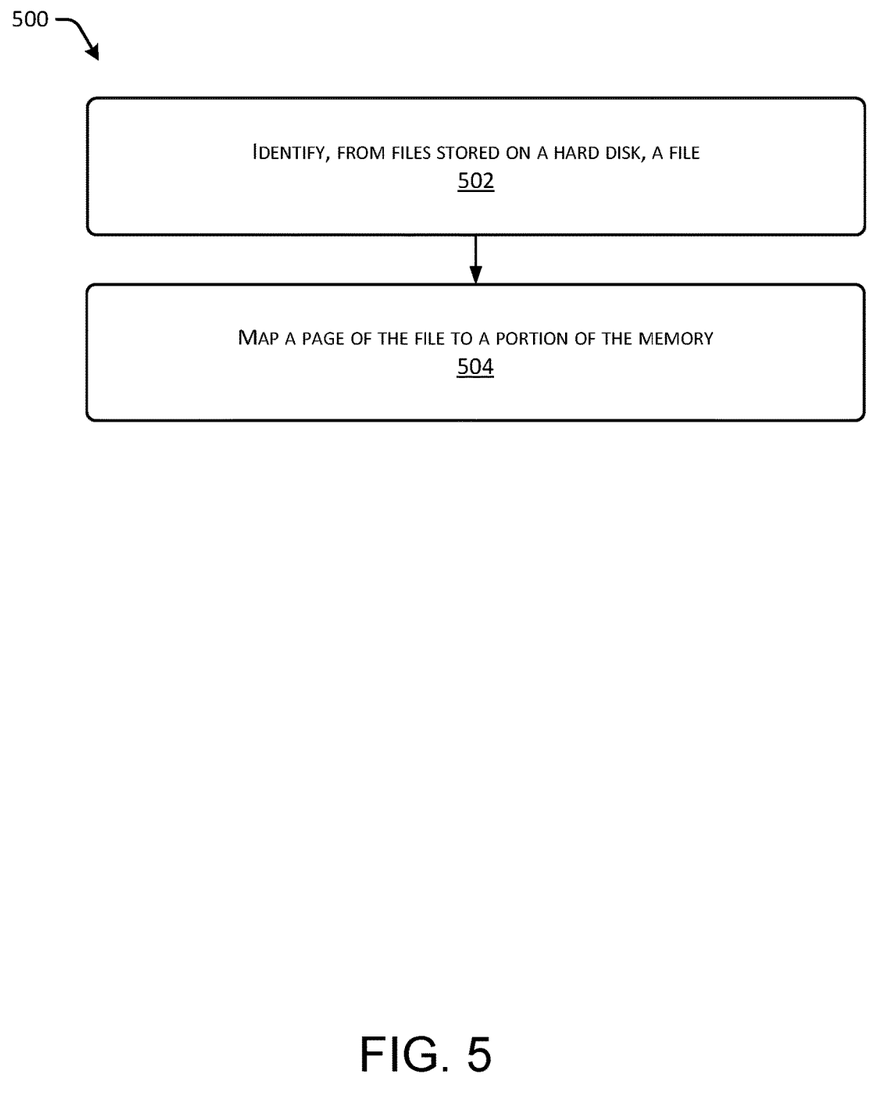
FIG. 5 depicts a non-limiting flow diagram illustrating a process for creating a mapping for a process.
Figure 6:
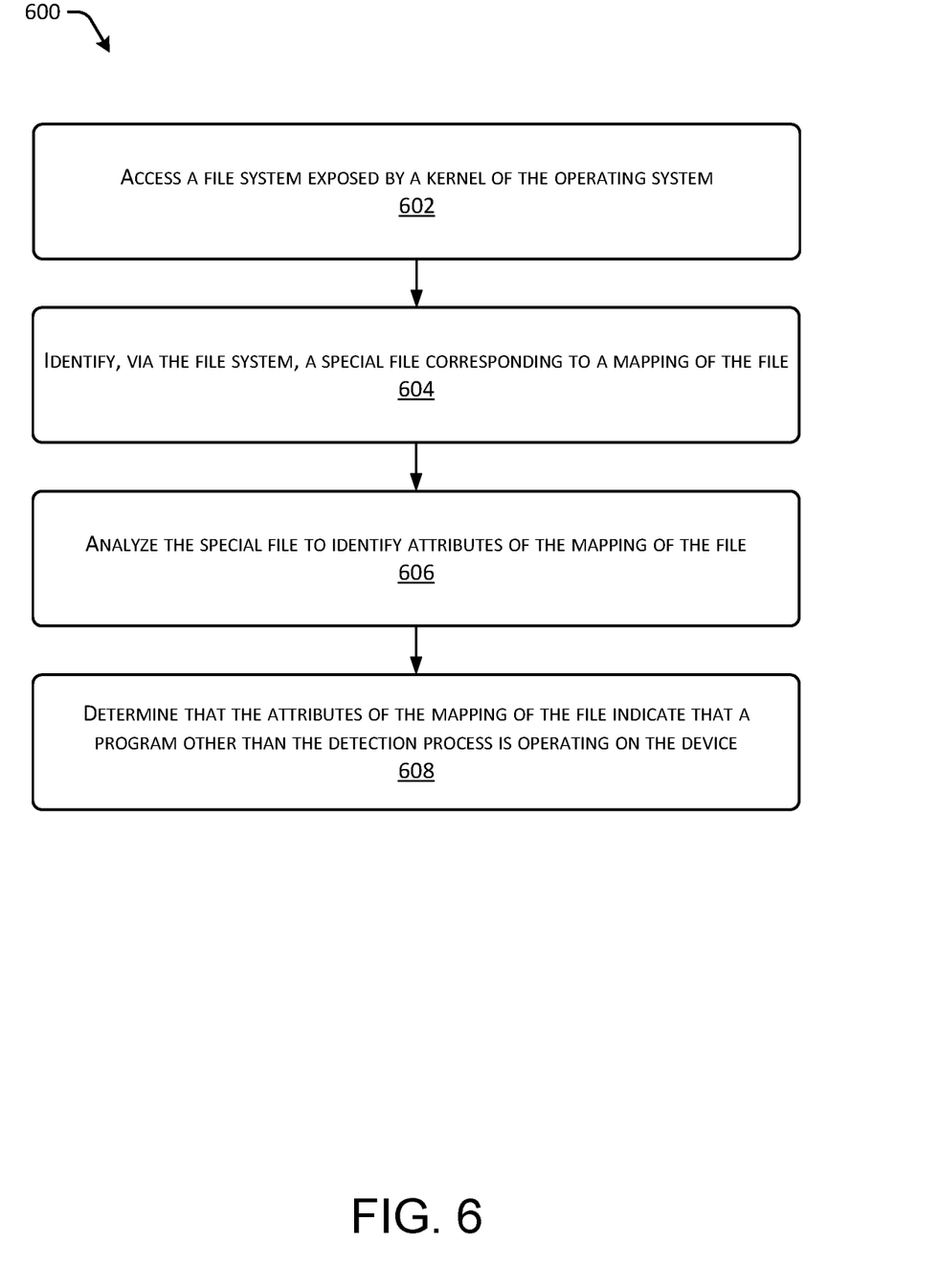
FIG. 6 depicts a non-limiting flow diagram illustrating a process for accessing a file system and analyzing attributes of a mapping of a file to determine that a program other than a detection process is operating on a device.

FIGS. 4-6 illustrate various processes for determining whether a process other than a detection process is running on a device. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 4 depicts a non-limiting flow diagram illustrating a process 400 for determining that another program other than a detection program is running on a device. In some examples, the blocks of method 400 are performed by various modules of the device 102, such as the detection process module 124, the operating system 118, and/or the kernel 130.

At block 402, the detection process module 124 may create a mapping (e.g., mapping 128) for a portion of data in a file between a virtual address, in a virtual address space (e.g., virtual address space 202) of the detection process module 124, and a physical address 214 in a physical address space (e.g., physical address space 212), of memory 122 of the computing device 102.

At block 404, the detection process module 124 may analyze information related to the virtual mapping of the file to the physical address in the physical address space of the memory 404. For instance, the detection process module 124 may analyze a special file including the information related to the mapping to identify at least one of a portion of shared dirty data that has been modified, an amount of data stored in the memory at the physical address for the mapping, or identify a portion of private dirty data of the detection program that has been modified.

At block 406, the detection process module 124 may determine that a program other than the detection process module 124 is using the mapping. In some examples, determining that the program other than the detection process module 124 is using the mapping may comprise determining that the amount of data stored in the memory at the physical address is different than the size of the portion of the data of the mapping.

At block 408, the detection process module 124 may send, via the network interface 112 and to a server system (e.g., network-accessible resource(s) 106) associated with the computing device, an indication that a program other than the detection process module 124 is using the mapping or is running. In some examples, the detection process module 124 may send the information included in the special file to the server system.

FIG. 5 depicts a non-limiting flow diagram illustrating a process for creating a mapping for a process. In some examples, the process 500 for creating the mapping may comprise creating mapping for a portion of data a file between a virtual address, in a virtual address space (e.g., virtual address space 202) of the detection process module 124, and a physical address 214 in a physical address space (e.g., physical address space 212), of memory 122 of the computing device 102. In various examples, the blocks of process 500 may correspond to block 402.

At 502, the detection process module 124 may identify, from files stored on a hard disk, a file to be mapped to memory. In various examples, the file may comprise data marked with a read only attribute. In various examples, the file may be a shell file, a VPN file, or a system binary file.

At 504, the detection process module 124 may map a page of the file to a portion of the memory of a device associated with the detection process module 124. In some instances, mapping the page of the file to the portion of the memory may comprise executing an open function to open the file stored in the hard disk to return a file description, and executing a system call mapping function including an indication of a virtual address of the file and an indication of the size of the file. In some instances, the size of the file may comprise a page, or 4,096 bytes.

FIG. 6 depicts a non-limiting flow diagram illustrating a process 600 for accessing a file system and analyzing attributes of a virtual mapping of a file to determine that a program other than a detection process is operating on a device. In some examples, the blocks of FIG. 6 generally correspond to blocks 404 and 406 of FIG. 4.

At block 602, the detection process module 124 may access a file system exposed by a kernel of the operating system executing on device 102. In some examples, the operating system may comprise a Unix-based operating system, and the file system may process a proc file system.

A block 604, the detection process module 124 may identify, via the file system, a special file corresponding to a mapping of the file. In some examples, the special file may comprise a SMAPS file which indicates attributes for the mapping of the file.

At block 606, the detection process module 124 may analyze the special file to identify attributes of the virtual mapping of the file. In some instances, the detection process module 124 may analyze the special file to identify at least one of an amount of data stored in memory at the physical address for the mapping of the file, a portion of shared dirty data that has been modified, or identify a portion of private dirty data of the detection program module 124 that has been modified.

At block 608, the detection process module 124 may determine that the attributes of the mapping of the file indicate that a program (e.g., background process 126) other than the detection process module 124 is operating on the device 102. In some examples, the determining may comprise determining that the amount of data stored in the memory is different than the size of the portion of the data of the mapping of the file. In various examples, the determining may comprise determining that a program other than the detection process module 124 is using the mapping is based at least in part on identifying the portion of shared dirty data. In further examples, the determining may comprise determining that a program other than the detection process module 124 is using the mapping is based at least in part on identifying the portion of the private dirty data of the detection program that has been modified The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A point-of-sale device comprising:
one or more processors;
a hard disk configured to store files;
memory configured to store the files for execution by the one or more processors; and
one or more computer-readable instructions that, when executed by the one or more processors, configure the one or more processors to perform operations comprising:
identifying, from the files stored on the hard disk, a shell file stored in the hard disk;
mapping a page of the shell file to a portion of the memory, wherein the mapping comprises designating a size of the page of the shell file;
accessing a file system exposed by a kernel of an operating system of the point-of-sale device, wherein the file system comprises entries for each process running on the point-of-sale device and special files containing information related to mappings for each process;
identifying, via the file system, a special file corresponding to the mapping of the shell file;
analyzing the special file to identify a proportional set size of the mapping of the shell file;
determining that the proportional set size is different than the size of the page of the shell file;
determining, based at least in part on determining that the proportional set size is different than the size of the page of the shell file, that a program other than the one or more computer-readable instructions is operating on the point-of-sale device; and
sending, to a payment server system associated with the point-of-sale device, an indication that the program other than the computer-readable instructions is operating on the point-of-sale device.

2. The point-of-sale device as claim 1 recites, wherein:
the operating system of the point-of-sale device comprises a Unix-based operating system;
the file system comprises a proc file system (procfs) associated with the Unix-based operating system; and
the special file comprises a SMAPS file exposed by the procfs for each process running on the point-of-sale device.

3. The point-of-sale device as claim 1 recites, wherein mapping the page of the shell file to the portion of the memory comprises:
executing an open function to open the shell file stored in the hard disk and return a file description; and
executing a system call mapping function, the system call mapping function including an indication of a virtual address of the page of the shell file and an indication of the size of the page of the shell file, wherein executing the system call mapping function comprises:
loading the page of the shell file from the hard disk to a physical address in the memory; and
establishing the mapping between the virtual address and the physical address of the shell file stored in the memory.

4. The point-of-sale device as claim 1 recites, wherein:
the size of the page of the shell file is designated as 4,096 bytes; and
determining that the proportional set size of the mapping of the shell file is different than the size of the size of the page of the shell file comprises determining that the proportional set size is greater than the 4,096 bytes.

5. A computer-implemented method comprising:
creating a mapping for a portion of data in a file between a virtual address, in a virtual address space of a detection program, and a physical address, in a physical address space of memory of a computing device, wherein the portion of the data is stored in the memory based at least in part on the physical address, wherein creating the mapping includes designating a size of the portion of the data;
analyzing information related to the mapping of the file at the physical address to identify an amount of data stored at the physical address space in the memory; and
determining, based at least in part on the amount of data stored in the memory being different than the size of the portion of the data, that a program other than the detection program is using the mapping.

6. The computer-implemented method as claim 5 recites, further comprising at least one of, based at least in part on determining that the program other than the detection program is using the mapping:
sending, to a server system associated with the computing device, an indication that the program other than the detection program is using the mapping; or
denying a secure session with the program other than the detection program.

7. The computer-implemented method as claim 5 recites, wherein:
analyzing the information related to the mapping comprises analyzing a special file including the information related to the mapping to identify a portion of shared dirty data that has been modified; and
determining that the program other than the detection program is using the mapping is further based at least in part on identifying the portion of shared dirty data.

8. The computer-implemented method as claim 5 recites, wherein:
analyzing the information related to the mapping comprises analyzing a special file including the information related to the mapping to identify a portion of private dirty data of the detection program that has been modified; and
determining that the program other than the detection program is using the mapping is further based at least in part on identifying the portion of the private dirty data of the detection program that has been modified.

9. The computer-implemented method as claim 5 recites, wherein the file comprises a read-only file, and the computer-implemented method further comprises identifying the read-only file.

10. The computer-implemented method as claim 5 recites, wherein:
analyzing the information related to the mapping of the file comprises analyzing a SMAPS file exposed by a proc file system of a Unix-based operating system that is implemented by the computing device; and
determining that the program other than the detection program is using the mapping comprises:
identifying, from the SMAPS file, a proportional set size of the mapping of the file at the physical address of the space in the memory; and
determining that the proportional set size of the mapping is different than the size of the portion of the data.

11. The computer-implemented method as claim 5 recites, wherein the detection program is operating absent a privilege to observe, via an operating system of the computing device, other programs operating on the computing device.

12. The computer-implemented method as claim 5 recites, wherein the file comprises at least one of:
a shell program file;
a virtual private network (VPN) file; or
a binary file stored in a system directory of an operating system of the computing device.

13. The computer-implemented method as claim 5 recites, wherein determining that the program other than the detection program is using the mapping comprises determining that the amount of data stored in the memory is greater than the size of the portion of the data.

14. One or more computer-readable media storing computer-executable instructions that, when executed by one or more processors, cause the one or more processors to perform acts comprising:
executing one or more mapping functions to create a mapping for a portion of data in a file between a virtual address space of a detection program and a physical address space of memory of a computing device;
analyzing information related to the mapping at the physical address space of the memory to identify a total amount of the memory being used by the mapping;
determining that the total amount of the memory being used by the mapping is different than a size of the portion of the data; and
determining, based at least in part on determining that the total amount of the memory being used by the mapping is different than the size of the portion of the data, that a program other than the computer-executable instructions is using the mapping.

15. The one or more computer-readable media as claim 14 recites, the acts further comprising sending, to a server system, an indication that the program other than the computer-executable instructions is using the mapping.

16. The one or more computer-readable media as claim 14 recites, wherein:
the one or more mapping functions designate the size of the portion of the data; and
determining that the total amount of the memory being used by the mapping is different than the size of the portion of the data comprises determining that the total amount of the memory being used is greater than the size of the portion of the data.

17. The one or more computer-readable media as claim 16 recites, wherein:
the size of the portion of the data is 4,096 bytes;
the file comprises a shell file; and
analyzing the information related to the mapping at the physical address space of the memory to identify the total amount of the memory being used by the mapping comprises identifying, from a SMAPS file, a proportional set size of the mapping.

18. The one or more computer-readable media as claim 14 recites, wherein the file comprises data marked with a read-only attribute.

19. The one or more computer-readable media as claim 14 recites, wherein:
a kernel of a Unix-based operating system exposes a proc file system (procfs); and
the information is stored in a SMAPS file in the procfs.

20. The one or more computer-readable media as claim 14 recites, wherein the one or more mapping functions designate the portion of the data in the mapping.

* * * * *